United States Patent [19]

Vitchenko et al.

[11] 4,267,475
[45] May 12, 1981

[54] CURRENT SUPPLY ARRANGEMENT FOR ELECTRIC MACHINE ROTOR WINDING

[76] Inventors: Vladimir S. Vitchenko, Vitebsky prospekt, 29, korpus 2, kv. 142; Gennady K. Smirnov, ulitsa Prazhskaya, 20, kv. 132; Vladimir G. Shalaev, Novo-Izmailovsky, 55, kv. 92, all of Leningrad, U.S.S.R.

[21] Appl. No.: 972,398

[22] Filed: Dec. 22, 1978

[51] Int. Cl.³ ............................................. H02K 39/08
[52] U.S. Cl. ...................................... 310/232; 310/61; 310/143; 310/227
[58] Field of Search ............... 310/238, 232, 165, 227, 310/61, 68 D, 68 R, 231, 219, 233, 113, 127–134, 261, 143–147

[56] References Cited

U.S. PATENT DOCUMENTS

| | | | |
|---|---|---|---|
| 1,281,862 | 10/1918 | Siegfried | 310/232 |
| 1,695,859 | 12/1928 | Richter | 310/232 |
| 2,671,865 | 3/1954 | Nippert | 310/232 |
| 2,679,604 | 5/1954 | Jaeschke | 310/232 |
| 2,798,977 | 7/1957 | Henter | 310/232 |
| 3,023,331 | 2/1962 | Hoffmann | 310/232 |
| 3,639,794 | 2/1972 | Karpman | 310/231 |
| 3,784,855 | 1/1974 | Motegi | 310/227 |

Primary Examiner—R. Skudy
Attorney, Agent, or Firm—Lackenbach, Lilling & Siegel

[57] ABSTRACT

Disclosed is a current supply arrangement for an electric machine rotor winding, comprising a slip ring made of a high-strength steel, fitted onto the rotor shaft with an electrically insulating layer therebetween, and adapted to be engaged by contact brushes of current collecting bars of the contact brush device. The slip ring is provided with a cylindrical recess cut in the end face thereof and disposed coaxially with the inner opening of said ring. The recess serves to receive a distributing ring made of a material having a high electrical conductivity, and provided with a current conducting bar secured thereto and electrically connected to the rotor winding by means of current conducting screws and a number of current supplying bars. The distributing ring is adapted to make electrical contact with the slip ring through an additional electrically conductive layer made of a homogeneous material and having a resistivity lower than that of the slip ring material. The additional electrically conductive layer has a circumference with a cross-sectional area increasing as the distance along an arc beginning at the point of junction of the current conducting bar with the distributing ring increases, thereby enabling the electric current flowing through the slip ring between the brushes of the current collecting bars and the current conducting bar secured to the distributing ring to be uniformly distributed around the periphery of the slip ring.

17 Claims, 9 Drawing Figures

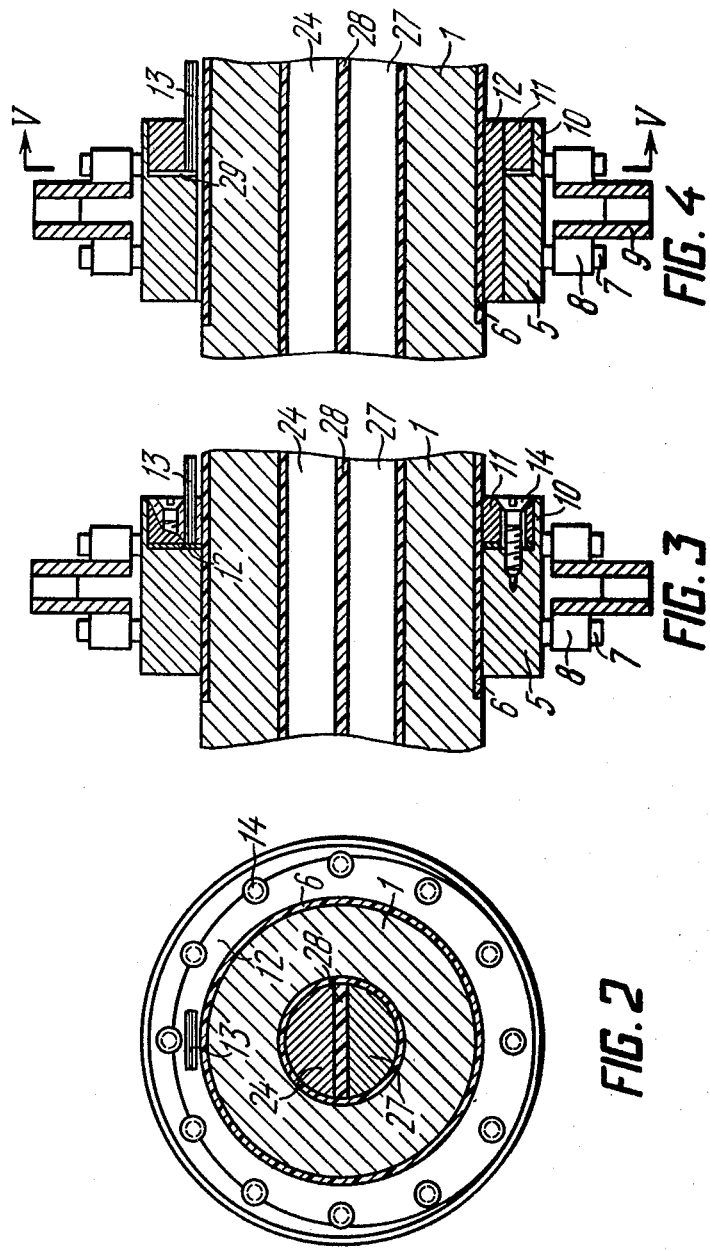

CURRENT SUPPLY ARRANGEMENT FOR ELECTRIC MACHINE ROTOR WINDING

FIELD OF THE INVENTION

The present invention relates to electric machines more, to current supply arrangements for electric machine rotor windings.

The invention can most advantageously be used in high-speed powerful turbogenerators necessitating prolonged trouble-free operation of a contact brush device used therein and reliable field current transfer to the turbogenerator rotor winding.

BACKGROUND OF THE INVENTION

In the course of operation of a high-speed powerful turbogenerator, an appreciable field current is supplied to the rotor winding from contact brushes of the contact brush device through a slip ring supported on the rotor shaft and subjected to significant mechanical loads associated with a substantial rotational speed of the rotor shaft, which loads require the slip ring to be formed of high-strength metal. In this case, however, the high field current is discharged not from the whole ring but only from a portion thereof, due to certain structural considerations, thus giving rise to a temperature difference across the ring and hence resulting in rapid wear of the ring and brushes and deteriorating the field current transfer to the rotor winding, the adverse effect being aggravated by the low electrical characteristics of the ring material.

The present invention is directed to minimizing said temperature difference and, hence, improving the field current transfer.

DESCRIPTION OF THE PRIOR ART

Known in the prior art is a current supply arrangement for an electric machine rotor winding (cf., e.g., the U.S.S.R Inventor's Certificate No. 256,043), which comprises a steel slip ring suitable to be fitted onto the electric machine rotor shaft and insulated therefrom by means of an electrically insulating layer. The arrangement is further provided with a distributing ring mounted adjacent the end face of the slip ring and having a current conducting bar secured thereto and electrically connected with the electric machine rotor winding. The distributing ring is made of an electrically conductive material and disposed to be in electrical contact with the slip ring through an additional electrically conductive layer designed as a number of segment-shaped spacers circumferentially mounted in abutting arrangement and disposed between the adjacent ends of the slip ring and distributing ring, the electrical conductivity of each spacer increasing along an arc in a direction away from the point of junction of the current conducting bar with the distributing ring. This provides for uniform distribution of the field current between the slip ring and the distributing ring. In addition, each segment-shaped spacer is made of a material having a resistivity which is lower than the resistivity of the slip ring material and higher than that of the distributing ring material. The brushes of the current collecting bars of the electric machine contact brush device are brought into contact with the outer peripheral surface of the slip ring.

The known current supply arrangement described hereinabove suffers from the disadvantages listed below.

Firstly, during the electric machine operation, the electric current flowing between the current collecting bar of the contact brush device and the current conducting bar secured to the distributing ring is non-uniformly distributed around the circumference of the slip ring. This uneven distribution of the electric current is caused by the fact that the conductance of the additional electrically conductive layer formed by a number of spacers varies unevenly along an arc from spacer to spacer. Furthermore, the transition reqions usually formed at the junctions of the adjacent spacers have a detrimental effect on the uniform distribution of the electric current, which results in the desired behavior of current distribution around the circumference between the adjacent points thereof not being closely followed. All these factors lead to non-uniform heating of the slip ring and the brushes contacting therewith, and eventually result in their mechanical and electrical wear, thus impairing the reliable operation of the electric machine contact brush device.

Secondly, among the disadvantages of the known construction is that the segment-shaped spacers are formed of a material having an electrical resistivity higher than the resistivity of the distributing ring material. Furthermore, contact resistances arise between the contact surfaces of the adjacent spacers. Taken together these factors impair the current-carrying capacity of the additional electrically conductive layer and give rise to increased heat losses of power supplied to the field winding.

Thirdly, the known current supply arrangement is complex in manufacture and assembly of elements incorporated therein, since, in order to provide a satisfactory operation of the arrangement, the arrangement accommodates a number of spacers which have different conductivities and are required to be precisely fixed by means of fastening members. For obtaining a predetermined value of contact resistance of the spacers or even for reducing said value, which is necessary to minimize spacer heating during the electric machine operation, the contact surfaces of the spacers are required to be finely finished with a high degree of precision and to be carefully matched during the assembling process.

SUMMARY OF THE INVENTION

It is an object of the present invention to provide a current supply arrangement for an electric machine rotor winding, which is simple in design and reliable in operation.

Another object of the present invention is to provide a current supply arrangement for an electric machine rotor winding, ensuring uniform distribution of the current flowing through the slip ring between the brushes of the contact brush device and the current conducting bar connected with the electric machine rotor winding.

Still another object of the present invention is to provide a current supply arrangement having an additional electrically conductive layer connecting the slip ring with the distributing ring and possessing an increased current-carrying capacity.

Yet another object of the present invention is to provide a current supply arrangement decreasing non-uniform wear of the brushes and the slip ring of the contact brush device and improving the electric current transfer from the brushes to the electric machine rotor winding.

A further object of the present invention is to increase the operational reliability of the contact brush device and of the whole electric machine.

With these and other objects in view, there is proposed a current supply arrangement for an electric machine rotor winding, comprising a slip ring adapted to be fitted onto a rotor shaft, with an electrically insulating layer therebetween, and to be engaged by contact brushes of current collecting bars of the contact brush device a distributing ring mounted on the end face of the slip ring is provided with a current conducting bar secured thereto and electrically connected to the rotor winding. The distributing ring is adapted for making electrical contact with the slip ring through an additional electrically conductive layer made of a material having a resistivity lower than the resistivity of the slip ring material. According to the invention, the additional electrically conductive layer is made of a homogeneous material and has a circumference with a cross-sectional area increasing as the distance along an arc from the point of junction of the current conducting bar with the distributing ring increases.

The advantage of the proposed arrangement, as compared to the prior art current supply arrangements, is that the electric current flowing through the slip ring between the current collecting bar of the contact brush device and the current conducting bar of the rotor winding is distributed substantially uniformly around the periphery of the slip ring, which is achieved by the provision of the additional electrically conductive layer made of a homogeneous material and having a cross-sectional area varying in the aforementioned manner.

In accordance with the present invention, the additional electrically conductive layer can be made of material from which the distributing ring is fabricated.

When the additional electrically conductive layer and the distributing ring are made of the same material, the current supply arrangement is simpler to manufacture. Furthermore, the current-carrying capacity of the additional electrically conductive layer tends to be increased since the distributing ring and, consequently, the additional layer are made of the material having a high electrical conductivity.

In one embodiment, the additional electrically conductive layer is designed as a flat circular projection formed on and projecting beyond the distributing ring end surface facing the slip ring.

The construction of the additional electrically conductive layer designed to be integral with the distributing ring simplifies the manufacture of the current supply arrangement and facilitates the precise fitting of the slip ring, the additional electrically conductive layer and the distributing ring. No transition region is formed between the contact surfaces of the distributing ring and the additional electrically conductive layer, thereby resulting in an increased current-carrying capacity of said layer and reduced losses in power supplied to the electric machine rotor winding.

In another embodiment of the invention, the additional electrically conductive layer is shaped like a flat washer arranged between the slip ring and the distributing ring.

By the provision of the additional electrically conductive layer shaped like a flat washer, the possibility exists of making said layer from a material possessing high stable electrical contact properties which also increases the current-carrying capacity of the layer and ensures the prolonged and reliable operation of the proposed current supply arrangement even though the electric machine operates out of doors or in aggressive media.

According to still another embodiment, the additional electrically conductive layer covers the inner surfaces of the slip and distributing rings and the inner openings of said rings made with the predetermined eccentricity, the eccentricity being in conformity with the nature of the variations of the cross-sectional area of the electrically conductive layer.

Such an arrangement of the additional electrically conductive layer also leads to uniform distribution of the electric current flowing, during the electric machine operation, through the slip ring between the current collecting bars of the contact brush device and the current conducting bar of the rotor winding, which results from the fact that the current flows from the slip ring peripheral surface contacting the brushes and through the slip ring body to the peripheral surface of the sleeve representing said additional electrically conductive layer, the current flowing across the entire width of the slip ring. In this case, an increased contact surface area between the slip ring and said layer makes it possible to increase the current-carrying capacity of the additional electrically conductive layer and improves heat transfer from the slip ring to the additional electrically conductive layer and then to the distributing ring.

In this embodiment, an electrically insulating layer may be interposed between the mating end faces of the slip ring and the distributing ring. This also causes the current flowing, during the electric machine operation, through the slip ring to be still more uniformly distributed over the entire width of said ring, since the electrically insulating layer prevents the current from flowing between the mating surfaces of the slip and distributing rings.

In still another embodiment, the additional electrically conductive layer is disposed on the inner surfaces of ventilation ducts, each defined by one pair of through openings provided in the slip ring and the distributing ring. The openings are evenly spaced over the periphery of said rings and have their longitudinal axes parallel to the longitudinal axes of the rings, the through openings of the slip ring each being disposed opposite to and coaxially with the respective through openings of the distributing ring. In this case, the additional electrically conductive layer is formed by a plurality of sleeves having different wall thicknesses increasing from duct to duct as the openings recede from the point of junction of the current conducting bar with the distributing ring.

Such an embodiment of the additional electrically conductive layer provides for uniform distribution of the current flowing, during the electric machine operation, through the slip ring between the current collecting bars of the contact brush device and the current conducting bar of the rotor winding over the entire width of the slip ring. This is derived from the fact that the current flows from the slip ring peripheral surface contacting the brushes and then through the slip ring body to the peripheral surface of each of the sleeves defining the additional electrically conductive layer, the current flowing along the paths having relatively small and substantially equal lengths. This is, in turn, determined by the provision of a plurality of sleeves defining said layer and disposed over the entire width of the slip ring owing to their arrangement within the ventilation ducts, the sleeves being positioned in a number of points within the body of the slip ring and rather close to the peripheral surface thereof. The tubes defining the additional electrically conductive layer are disposed within a number of ventilation ducts, and the contact surface of said layer is found to be sufficiently large, which gives rise to an increased current-carrying capacity of the additional electrically conductive layer without any increase, and even with a certain decrease, in the overall dimensions of the current supply arrangement. Furthermore, a more efficient cooling of the transition regions formed between the additional electrically conductive layer and the slip ring and also between said layer and the distributing ring takes place.

The ventilation ducts may be designed to be equal in diameter. In this case, the sleeves defining the additional electrically conductive layer have their inner diameters reduced as the through openings move along an arc away from the point of junction of the current conducting bar with the distributing ring.

When the sleeves are designed to all be equal in outer diameter, it is easier to bore through openings of the same diameter in the slip ring made of a strong metal alloy. Besides, the sleeves of equal diameter having a required wall thickness can be easily selected from a broad spectrum of industrially manufactured sleeves.

The ventilation ducts can be designed to have a diameter which is increased as the through openings recede along an arc from the point of junction of the current conducting bar with the distributing ring. In this case, the sleeves defining the additional electrically conductive layer are equal in inner diameter.

Such a construction is of particular interest when there are stringent requirements upon cooling the slip ring and the distributing ring of the current supply arrangement used in the electric machine operates at is maximum power-carrying capacity.

In still another embodiment, the additional electrically conductive layer covers the inner surfaces of the ventilation ducts each formed by a pair of through openings of equal diameter provided in the slip and distributing rings in such a manner that they are circumferentially disposed and have their longitudinal axes parallel to the longitudinal axes of said rings. Each of the openings of the slip ring are disposed opposite to and coaxially with a respective through opening of the distributing ring, the adjacent through openings of each ring being spaced by a distance reducing as the through openings recede along an arc from the point of junction of the current conducting bar with the distributing ring. The additional electrically conductive layer is defined by sleeves of equal diameter having the same thicknesses of the walls.

When employing the tubes of equal outer diameter having the same wall thicknesses it is convenient to bore the through openings in the slip ring and the distributing ring. Besides, the sleeves having a required cross-section can be easily selected from a broad spectrum of industrially manufactured sleeves. Furthermore, the larger spaces between the adjacent through openings provided in said rings can be used to accommodate additional ducts incorporating auxiliary elements of the electric machine, such as tubes supplying water for cooling the rotor winding in case of a liquid cooled rotor.

BRIEF DESCRIPTION OF THE DRAWING

The above mentioned and other features and objects of this invention and the manner of attaining them will become more apparent, and the invention itself will be better understood, by reference to the following description of illustrated embodiments of the invention, taken in conjunction with the accompanying drawings, wherein:

FIG. 2 is a cross-sectional view taken along line II—II of FIG. 1 and illustrating a slip ring of the electric machine current supply arrangement fitted onto the rotor shaft; in accordance with the invention;

FIG. 3 is a longitudinal sectional view illustrating another embodiment wherein an additional electrically conductive layer is shaped like a flat washer, in accordance with the invention;

FIG. 4 is a longitudinal sectional view illustrating another embodiment of the invention, showing an additional electrically conductive layer contacting the inner surfaces of the slip and distributing rings;

It should be noted that the accompanying drawings are merely a schematic illustration of the present invention, and that various changes in the shape, size, arrangement of parts, and so on are possible.

DETAILED DESCRIPTION OF THE INVENTION

Figure 1:
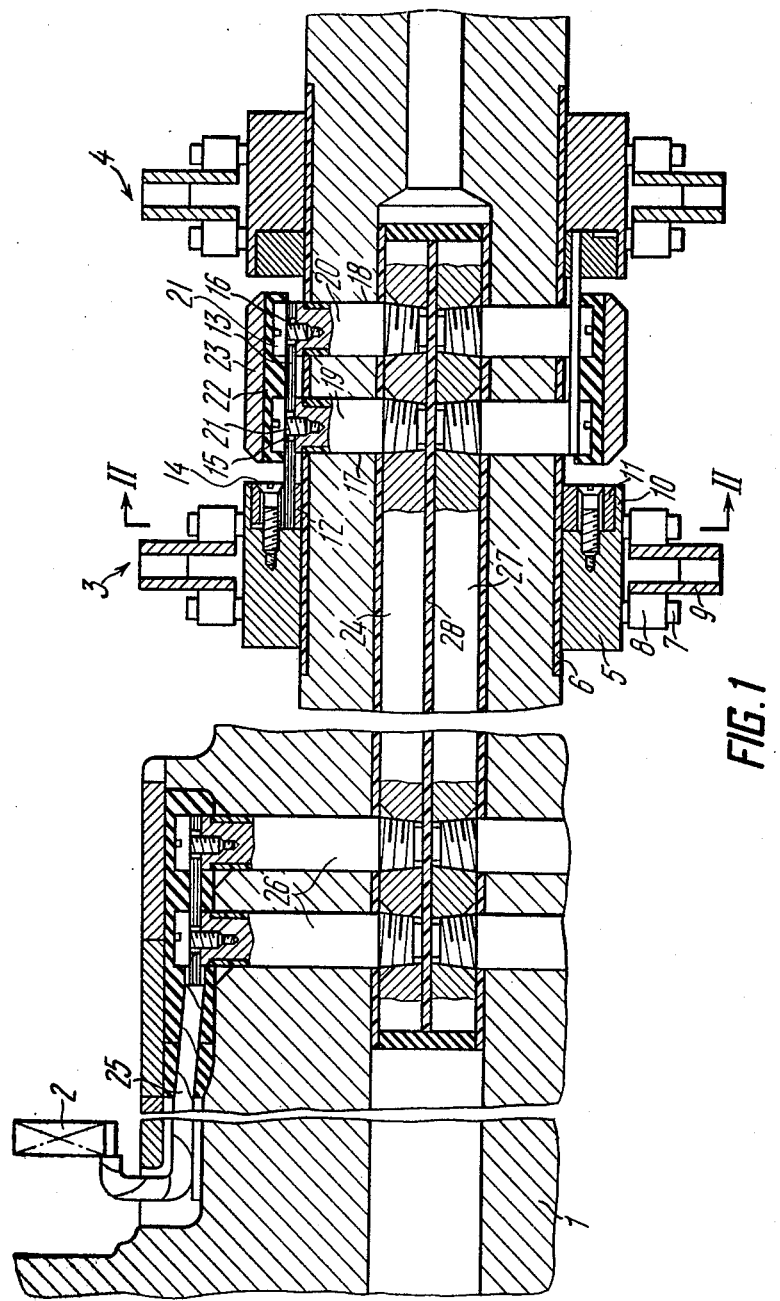
FIG. 1 is a longitudinal sectional view illustrating a part of the electric machine rotor provided with a current supply arrangement, in accordance with the invention.

Referring now to the drawings, and more particularly to FIG. 1, the electric machine rotor, namely the rotor of a powerful turbogenerator, comprises a shaft 1 and a rotor exciting winding 2. The contact brush device of the turbogenerator comprises a positive current supply arrangement 3 and a negative current supply arrangement 4 to be used for supplying the field current to the rotor winding 2.

The positive current supply arrangement 3 includes a slip ring 5 made of high-strength steel, fitted onto the rotor shaft 1 and insulated therefrom by an electrically insulating layer 6. Arranged around the periphery of the slip ring 5 are brushes 7 adapted to be in contact with the peripheral surface of the slip ring and mounted in brush holders 8 of current collecting bars 9 of the contact brush device. The slip ring 5 is provided with a cylindrical recess 10 cut in the end face thereof and disposed coaxially with the inner opening of the slip ring 5. The recess 10 serves to receive a distributing ring 11 mounted therein and electrically contacting with the slip ring 5 through an additional electrically conductive layer 12 shaped like a flat circular projection formed on the distributing ring end facing the slip ring 5. The projection defining the additional electrically conductive layer 12 is integral with the distributing ring 11 and made of a homogeneous material. Said projection has an asymmetrical configuration, its circumference having a cross-sectional area gradually increasing in a direction following an arc from the point of junction of a current conducting bar 13 with the distributing ring 11. The current conducting bar 13 mounted in the distributing ring 11 is positioned close to the inner surface of said ring. The distributing ring 11 (FIG. 1) together with the additional electrically conductive layer 12 is tightly pressed against the slip ring 5 and secured thereto by means of screws 14.

The current conducting bar 13 is provided with two openings 15 and 16 longitudinally arranged thereon and disposed above respective radially arranged openings 17 and 18 provided in the rotor shaft 1. The openings 15, 17 and 16, 18 are coaxially arranged in pairs and suitable to receive current conducting screws 19 and 20 with a taper thread, respectively, which screws are secured to the current conducting bar 13 by means of fastening screws 21. Mounted on the current conducting screws 19 and 20 are electrically insulating gaskets 22, on which gaskets binding clips 23 are placed and bolted to the rotor shaft 1. Said clips prevent the current conducting screws 19 and 20 from displacements caused by centrifugal forces generated during the turbogenerator operation. The current conducting screws 19 and 20 are screwed into a positive connecting bar 24 which connects said screws with a terminating bar 25 of the rotor winding 2, the bar 25 being secured to the connecting bar 24 by means of current conducting screws 26.

The negative current supply arrangement 4 is essentially similar to the positive current supply arrangement 3 and includes the same elements indicated by the same reference numerals. The difference between them is that the current conducting screws 19 and 20 of the arrangement 4 are screwed into a negative connecting bar 27 separated from the positive connecting bar 24 by an electrically insulating layer 28. The negative connecting bar 27 is connected with the rotor winding 2 in a similar way similar elements as for the positive connecting bar 24.

In the embodiment shown in FIG. 3, the additional electrically conductive layer 12 is shaped like a flat washer fitted onto the rotor shaft 1, separated therefrom by the electrically insulating layer 6, and mounted intermediate the slip ring 5 and the distributing ring 11. The flat washer forming the additional electrically insulating layer 12 has a circumference having a cross-sectional area uniformly increasing along an arc moving away from the point of junction of the current conducting bar 13 with the distributing ring 11. The slip ring 5, the additional electrically conductive layer 12 shaped like a washer and the distributing ring 11 are held together by screws 14.

As best shown in FIG. 4, the additional electrically conductive layer 12 covers the inner surfaces of the slip ring 5 and of the distributing ring 11, and bears against the electrically insulating layer 6. In this case, the layer 12 makes electrical contact simultaneously with the slip ring 5 and the distributing ring 11, thus providing for electrical connection between the slip ring 5 and the distributing ring 11. The layer 12 (FIG. 5) has a circumference having a cross-sectional area uniformly increasing in a direction following an arc starting from the point of junction of the current conducting bar 13 with the distributing ring 11. The inner openings of the slip ring 5 and the distributing ring 11 are eccentric to the central axes of said rings, the eccentricity corresponding to the nature of the variations in the cross-sectional area of the layer 12, and the cross-sectional area of the rings 5 and 11 decreasing as the cross-sectional area of the layer 12 increases. Disposed between the mating end surfaces of the slip ring 5 (FIG. 4) and the distributing ring 11 is an electrically insulating layer 29 which is applied over the peripheral surface of the distributing ring 11 and over its end surface facing the end surface of the slip ring 5. In general, however, the application of the electrically insulating layer 29 is of no particular importance. The slip ring 5, the distributing ring 11 and the electrically conductive layer 12 are joined together by means of explosive impact welding, as will be readily described hereinbelow.

Figure 7:
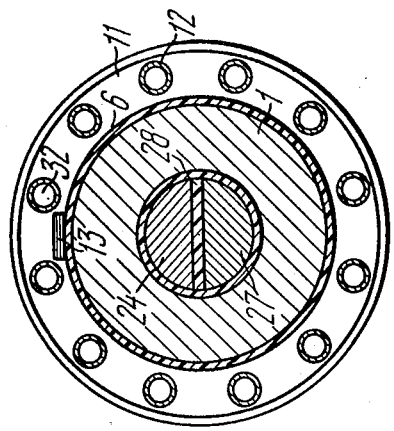
FIG. 7 is a cross-sectional view taken along line VII—VII of FIG. 6 and illustrating a slip ring of the current supply arrangement.
Figure 6:
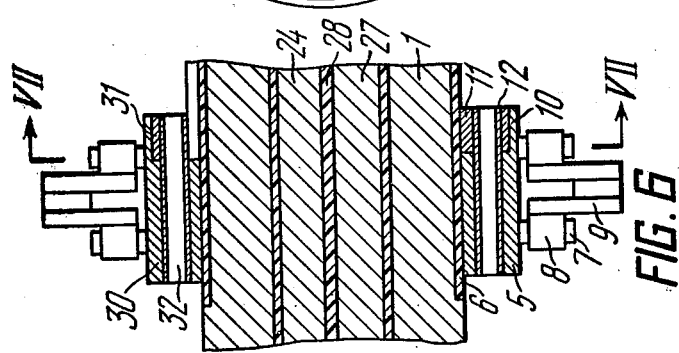
FIG. 6 is a longitudinal view illustrating still another embodiment wherein the additional electrically conductive layer is disposed in ventilation ducts formed in the slip and distributing rings.

As indicated in FIG. 6, the slip ring 5 of the proposed current supply arrangement is provided with a number of circumferentially arranged cylindrical through openings 30, while the distributing ring 11 is provided with the same number of circumferentially arranged cylindrical through openings 31, the openings being equal in diameter and having their longitudinal axes disposed in parallel with the longitudinal axes of said rings. Each of the through openings 30 of the slip ring 5 is designed to be opposite to and coaxially arranged with a respective through opening 31 of the distributing ring 11, thus forming ventilation ducts 32. The through openings 30 and 31 provided in the slip ring 5 and the distributing ring 11, respectively, are arranged close to the periphery of said rings and spaced at equal intervals around the circumferences of said rings (FIG. 7). In this embodiment, the additional electrically conductive layer 12 is disposed on the inner surfaces of the ventilation ducts 32 formed as described hereinabove. In this case, said layer 12 is in electrical contact with the slip ring 5 and with the distributing ring 11, simultaneously, resulting in the slip ring 5 and the distributing ring 11 being electrically interconnected. The additional electrically conductive layer 12 disposed in the ventilation ducts 32 is defined by thin-walled sleeves having the same outer diameter which is equal to the diameter of the ventilation ducts 32, but differing in their inner diameters. The inner diameter of the sleeves decreasing from sleeve to sleeve as the through openings 31 recede along an arc from the point of junction of the current conducting bar 13 with the distributing ring 11. As a result, the wall thickness of each successive sleeve increases, whereby the cross-sectional area of the additional electrically conductive layer 12 formed by said sleeves increases in a direction away from the point of junction of the current conducting bar 13 with the distributing ring 11.

Mounted intermediate of the current supply arrangements 3 and 4 is a blower (not shown) adapted to force air into the ventilation ducts 32 for the purpose of cooling the slip ring 5, the distributing ring 11 and the additional electrically conductive layer 12 which are heated during the turbogenerator operation.

Figure 8:
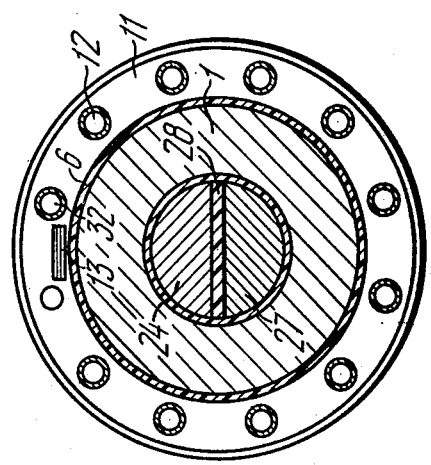
FIG. 8 is a cross-sectional view similar to FIG. 7, but illustrating a slip ring of the current supply arrangement embodied in FIG. 6.

According to the embodiment indicated in FIG. 8, the diameter of the ventilation ducts 32 defined by the through openings 30 and 31 provided in the slip ring 5 and in the distributing ring 11, respectively, increases from duct to duct, as the through openings 31 recede along an arc from the point of junction of the current conducting bar 13 with the distributing ring 11. In doing so, the sleeves defining the additional electrically conductive layer 12 contacting the inner surfaces of the ventilation ducts 32 differ in their outer diameters which are correspondingly increased. As a result, although the sleeves are equal in inner diameter, the sleeve wall thicknesses and hence the cross-sectional area of the additional layer 12 formed by said sleeves increase along an arc from the point of junction of the current conducting bar 13 with the distributing ring 11.

Figure 9:
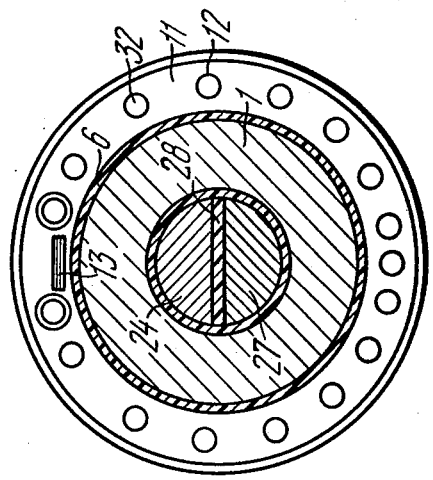
FIG. 9 is a cross-sectional view similar to FIG. 7, but illustrating a slip ring of still another embodiment of the current supply arrangement of FIG. 6.

In the embodiment illustrated in FIG. 9, the through openings 30 and 31 of the slip ring 5 and the distributing ring 11, respectively, and the ventilation ducts 32 formed thereby are equal in diameter. In this case, the additional electrically conductive layer 12 is formed by sleeves which are equal both in inner and in outer diameters, and, hence, have the same wall thicknesses. Moreover, the through openings 30 and 31 and, consequently, the ventilation ducts 32 formed thereby are circumferentially arranged and spaced at intervals decreasing as the openings recede along an arc from the point of junction of the current conducting bar 13 with the distributing ring 11, whereby the cross-sectional area of the additional electrically conductive layer 12 formed by sleeves of equal diameter disposed within the ventilation ducts 32 increases in a direction away from the point of junction of the current conducting bar 13 with the distributing ring 11.

Thus, in all the embodiments of the proposed current supply arrangement for the electric machine rotor winding, the distributing ring 11 is put into electrical contact with the slip ring 5 by an additional electrically conductive layer 12 having a circumference with a cross-sectional area increasing along an arc from the point of junction of the current conducting bar 13 with the distributing ring 11.

The proposed current supply arrangement operates as follows.

The operation of the proposed arrangement will be described in connection with the positive current supply arrangement 3 (FIG. 1).

When the exciting winding of the generator is supplied with electric current, the current is applied to the current collecting bars 9 of the generator contact brush device and is then distributed onto the brushes 7 arranged in a number of rows (for simplicity, the brushes of only two rows are shown in the drawings). In each row, the brushes 7 are evenly distributed around the periphery of the slip ring 5. The electric current then flows from each brush 7 onto the slip ring portion contacting that brush, and through the body of the slip ring 5. The current paths extending from each brush 7 of each row to the additional layer 12, formed of a material having an electrical conductivity higher than that of the slip ring material, run through those portions of the slip ring 5, which have the minimum electrical resistance, i.e. along the shortest paths extending radially from the slip ring surface to the surface of the additional layer 12. From the additional layer 12, the current flows to the distributing ring 11 and then to the current conducting bar 13 secured thereto.

In the body of the additional layer 12 and in the body of the distributing ring 11 the paths of current passing from the additional layer surface to the current conducting bar 13 are found to be increased in a direction away from the point of junction of the current conducting bar 13. In this case, it is expected that the electrical resistance would be increased in the same proportion. However, due to the provision of the additional layer 12 having a circumference with a cross-sectional area uniformly increasing along an arc from the point of junction of the current conducting bar 13, the electrical resistance of said layer tends to be uniformly decreased in the same manner. As a result, the electrical resistance and the current passing from each of the brushes 7 in each row is substantially constant along all current paths extending from the point of junction of the current conducting bar 13 with the distributing ring 11 to the diametrically opposite point, whereby a uniform distribution of the current around the periphery of the slip ring 5 is attained.

Then the electric current is directed from the current conducting bar 13 to the rotor exciting winding 2, the current passing through the circuit comprising the current conducting screws 19 and 20, the connecting bar 24, the current conducting screws 26 and the terminating bar 25.

The negative current supply arrangement 4 operates in a similar way. The difference lies in that the electric current flows in the opposite direction.

The operation of the embodiment shown in FIG. 3 is also no different from the operation described hereinabove. In this case, the additional electrically conductive layer 12 is formed by a flat washer having a cross-sectional area varying in a manner described hereinabove.

As found experimentally, the nature of the current distribution around the periphery of the slip ring 5 is virtually unaffected by the contact resistance between the contacting surfaces of the washer and the distributing ring 11, provided that said elements are tightly pressed together.

When employing a washer made of metal or alloys having high electrical contact properties, the contact resistance arising between the washer and the distributing ring 11 and also between the washer and the slip ring 5 is found to be of a small value which is constant for an extended period over the entire contact surface. This is of particular importance for an electric machine operating with high field currents or in an agressive medium, for example, when operating in rooms with high air pollution, out of doors, or in an atmosphere containing harmful gases.

In the embodiment shown in FIG. 4, the additional electrically conductive layer 12 is disposed on the inner surfaces of the slip ring 5 and the distributing ring 11. In this case, during the generator operation, the electric current passing through the slip ring 5 flows onto the additional layer surface contacting therewith and moves along paths directed substantially radially with respect to the surface of said layer 12. Since the cross-sectional area of the additional layer 12 is variable (FIG. 5), this embodiment, like the embodiment mentioned hereinabove, enables the current passing through the slip ring 5 from the brushes 7 of one of the rows to be uniformly distributed around the circumference of said ring. Furthermore, the current paths from the adjacent brushes 7 disposed in various rows are found to have the same minimum length which is substantially equal to the thickness of the slip ring at the points of its contact with the brushes. As a result, the electric current flowing through the slip ring 5 is found to be uniformly distributed both around the circumference of said ring and across the entire width thereof.

The electrically insulating layer 29 mounted intermediate the slip ring 5 and the distributing ring 11 prevents the electric current from passing through the mating surfaces of said rings, and thus provides for uniform distribution of the current flowing through the slip ring 5 owing to improved distribution of the electric current across the width of said ring, resulting from the current paths extending substantially radially with respect to the surface of the additional electrically conductive layer 12.

Upon passing the additional electrically conductive layer 12, the electric current flows through the distributing ring 11 embracing the layer 12 in a manner according to this embodiment of the invention, and then passes to the current conducting bar 13, and through the current conducting screws 19 and 20, the connecting bar 24, the current conducting screws 26 and the terminating bar 25 to the rotor winding 2.

In the embodiment shown in FIG. 6, the additional electrically conductive layer 12 is disposed on the inner surfaces of the ventilation ducts 32 provided in the slip ring 5 and the distributing ring 11. In doing so, the uniform distribution of the current both around the circumference of the slip ring 5 and across the width thereof is attained in the following way.

In high-power turbogenerators of 200 to 800 MW, a field current reaching a value ranging from 2,000 to 6,000 A, is passed through the slip ring 5. Therefore, for effective cooling of said ring, the ring is provided with a plurality of ventilation ducts 32 equally spaced around the circumference thereof. Consequently the number of sleeves constituting the additional electrically conductive layer 12 is also rather high and they are equally spaced around the circumference of the slip ring 5. For given values of the generator field current, the number of brushes 7 contacting with the peripheral surface of the slip ring 5 ranges to several dozens, the density of their distribution being rather high. Hence, for each brush 7 of the same row, the paths of the current passing from the peripheral surface of the slip ring 5 to the outer surfaces of the sleeves constituting the additional electrically conductive layer 12 are substantially equal in length which is also the case for the brushes 7 disposed in different rows. Due to this fact and to the provision of the additional electrically conductive layer 12 formed by the sleeves having a thickness of the walls varying from sleeve to sleeve, for the current supplied from the brushes 7 of each row, the electrical resistance arising in the regions between the outer surface of the slip ring 7 and sleeves defining the layer 12 is found to be equal. Moreover, said resistance turns out to be essentially uniform, since the current is distributed around the circumference of the slip ring 5. The current being uniformly distributed around the circumference of the slip ring 5, for each row of the brushes, the current distribution across the width of said ring is also sufficiently uniform. Here, the transition region arising between the slip ring 5 and the sleeves constituting the additional electrically conductive layer 12 has no appreciable effect on the operation of the current supply arrangement since the electric resistance of said region is closely approximated by the electric conductivity of the material of said layer, which is determined by the manner of joining the sleeves with the rings as described hereinbelow, which provides good electrical characteristics of said region.

From the sleeves constituting the layer 12 the electric current flows into the area with a lower electric resistance, specifically, into the end distributing ring 11, the lower resistance of said ring being determined by a cross-sectional area which is considerably greater than the cross-sectional area of each sleeve at the point of its contact with the ring 11. In the body of the distributing ring the currents from all the sleeves are summed and supplied to the current conducting bar 13 and then directed through the current conducting screws 19 and 20, the connecting bar 24, the current conducting screws 26 and the terminating bar 25 to the rotor exciting winding 2.

In the embodiment indicated in FIG. 9, the sleeves constituting the additional layer 12 have the same inner diameters and the same outer diameters, but the distance between the successive ducts 32 varies from duct to duct. In this case the uniform distribution of the current flowing through the slip ring 5 is attained in much the same manner as described above, except that the current flowing from the brushes 7 of each row into the slip ring 5 is uniformly distributed around the circumference thereof precisely owing to the fact that the ventilation ducts 32 are unequally spaced, the nature of variations in length of the spaces corresponding to the general nature of variations in cross-sectional area of the additional electrically conductive layer 12.

Manufacturing and assembling of the embodiments of the proposed arrangement are performed as follows.

According to the embodiment illustrated in FIG. 1, the additional electrically conductive layer 12 is made integral with the distributing ring 11. To provide the required configuration of the distributing ring projection defining the layer 12 and arranged eccentrically to the longitudinal axis of the ring 11, a blank for the distributing ring 11 is positioned in a metal-working machine with a predetermined displacement of its longitudinal axis from the main axis of the metal-working machine. One end of the blank is machined in a radial and axial direction to a desired depth. Then axially arranged openings adapted for receiving the fastening screws 14 are drilled in the blank for the distributing ring 11, while the respective threaded holes suitable for said screws and the end cylindrical recess are formed in the blank for the slip ring 5. Upon soldering the current conducting bar 13 into the suitable opening provided in the distributing ring 11, the ring is mounted into the end cylindrical recess 10 provided in the slip ring 5. The two rings are then secured together by the screws 14, thus forming an integral unit. Then the boring of the inner diameter of the mounting surface of the assembled unit is performed. The unit is heated to a predetermined temperature, whereupon it is fitted onto the rotor shaft 1 of the generator covered with the electrically insulating layer 6. As a result, upon cooling, a tight mechanical connection of the slip ring 5 with the rotor shaft 1 is obtained. After fitting the arrangement onto the rotor shaft 1, the arrangement is cooled to the ambient temperature, whereupon the current conducting bar 13 is brought into contact with the connecting bar 22 by means of the current conducting screws 19 and 20 which are then secured to the rotor shaft 1 by means of the electrically insulating gaskets 22 and the clips 23.

In the embodiment illustrated in FIG. 3, the additional electrically conductive layer 12 is formed by a flat washer which is manufactured separately. To provide the required configuration of the washer, the blank for the washer is positioned in a metal-working machine with a certain displacement with respect to the main axis of the machine. Then the machined washer, the slip ring 5 and the distributing ring 11 are held together in an integral unit. The assembled unit is further machined in a similar way described above. Upon heating, the assembled unit is fitted onto the rotor shaft 1, whereupon the current conducting bar 13 is joined to the connecting bar 24.

Figure 5:
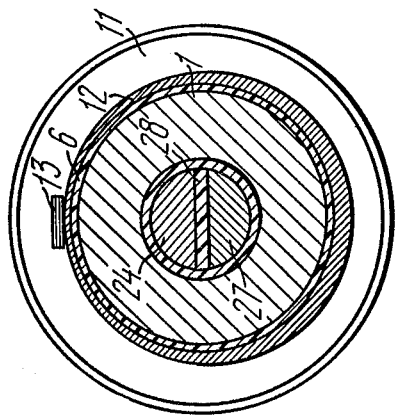
FIG. 5 is a cross-sectional view taken along line V—V of FIG. 4 and illustrating a slip ring of the current supply arrangement fitted onto the electric machine rotor shaft.

In the embodiment shown in FIGS. 4 and 5, the additional electrically conductive layer 12 covers the inner surfaces of the slip ring 5 and the distributing ring 11 and is designed as a thin-walled sleeve which is also manufactured separately. The required eccentric configuration of the sleeve and, hence, of the inner openings of the slip ring 5 and the distributing ring 11 is obtained in the same manner as described above. The difference resides only in the manner of joining the elements constituting the proposed arrangement.

According to this embodiment, the elements are held together by means of explosive impact welding consisting of the following steps. The sleeve forming the additional layer 12 is first fitted with a minimum clearance into the inner openings provided in the slip ring 5 and the distributing ring 11 which are held together. It should be noted that the layer 29 of electrically insulating varnish may be introduced between the adjacent end faces of said rings. Then the sleeve is fitted onto a suitable mandrel having its outer diameter somewhat less than the inner diameter of the sleeve. As a result, a clearance formed between the inner surface of the sleeve and the peripheral surface of the mandrel is used to accommodate an explosive substance. The explosive substance is then ignited by any known method, thus providing a reliable connection of said elements into an integral unit.

The same effect can be achieved when using cold welding with the use of hydraulic means. In this case, the clearance formed between the sleeve forming the layer 12 and the mandrel is filled with any suitable working fluid, whereupon it is hermetically sealed and then communicated with a source of pressure.

Furthermore, a method for connecting the elements to form an integral unit may be based on an electrohydraulic effect. For this purpose, electrodes are introduced into the working fluid filling up the hermetically sealed clearance defined between the sleeve forming the additional layer 12 and the mandrel, the electrodes being connected with a source of high pulsed voltage. As a result of a sequence of high voltage discharges, the elements are caused to be interconnected to form an integral unit.

The use of these joining methods provides for a high quality of adherence of heterogeneous materials while maintaining the properties of these materials and forming a transition region wherein the materials possess a uniform structure due to diffusion, said region exhibiting good mechanical and electrical characteristics.

Upon completing the process of joining, the assembled unit is machined as described hereinabove, and then the preheated unit is fitted onto the rotor shaft 1 and the current conducting bar 13 is brought into connection with the connecting bar 24.

In the embodiment shown in FIGS. 6, 7, 8 and 9, the end cylindrical recess 10 is first bored in the blank for the slip ring 5, and the through cylindrical openings 30 are formed with the use of a drilling jig. Then the current conducting bar 13 is soldered into the distributing ring 11 and the through cylindrical openings 31 are also formed in said ring with the use of a drilling jig. Following these steps, the assembling of the rings is performed.

To accomplish it, the distributing ring 11 is mounted into the end recess 10 of the slip ring 5, and the through openings 30 and 31 are coaxially arranged in pairs to receive the sleeves forming the layer 12, whereupon the process of connecting the elements into an integral unit takes place. The best results may be achieved, when connecting the elements, by means of explosive impact welding described hereinabove or by supplying high pressure generated by hydraulic and electrohydraulic means. Then the assembled unit is further machined, as in the case of above mentioned embodiments, whereupon the preheated unit is fitted onto the rotor shaft 1, and the current conducting bar 13 is connected to the connecting bar 24.

In all the embodiments of the present invention, the slip ring 5 is made of steel, the use of which should provide the required strength of the ring needed to counteract the considerable centrifugal forces generated during operation of the generator and dictated by the conditions of its fitting onto the rotor shaft 1 during the assembling process. In addition, the steel used for manufacturing this ring should exhibit an increased wear resistance. In all the embodiments, the distributing ring 11 is made of copper. In a turbogenerator with an output of about 300 MW, an exciting current of about 2,900 A and a mounting diameter of the slip ring equal to 300 mm, the thickness of the projection made on the distributing ring 11 and forming the additional electrically conductive layer 12 is in the range from 0.5 to 1 mm, while the width of said projection is in the range from 20 to 35 mm, and the current density in this layer is equal to 2 A/sq mm.

In the embodiment illustrating the additional electrically conductive layer 12 shaped like a flat washer, the washer is made of copper, copper alloy, silver alloy or any known metals and alloys possessing high electrical contact properties, the overall dimensions of said layer being approximately equal to the overall dimensions of the projection forming said layer, as indicated hereinabove.

In the embodiments showing the additional electrically conductive layer 12 formed by a thin-walled sleeve or by a plurality of sleeves, the layer 12 could be made from copper or from copper alloys providing for the most efficient adhesion of the sleeve surfaces forming the layer 12 with the surfaces of the slip ring 5 and the distributing ring 11, while maintaining the required current carrying capacity of the layer 12. In a turbogenerator having the electrical parameters mentioned above, the thin-walled sleeve has a thickness ranging from 2 to 8 mm, while the thicknesses of the sleeves disposed in the ventilation ducts 32 are about 2 mm. The sleeves forming the additional electrically conductive layer 12 may differ in their diameters which are dictated by various structural considerations, by turbogenerator output, by predetermined cooling conditions for the current supply arrangement, etc.

The electrically insulating layer 29 may be made of varnishes based on silicone resin having sufficiently high electrical and thermal characteristics.

The proposed current supply arrangement, when used in powerful high-speed turbogenerators where the slip rings 5 are subjected to significant mechanical and electrical loads, ensures identical operating conditions of all the brushes 7 owing to uniform distribution of the electric current flowing through the distributing ring 11 and, consequently, owing to uniform heating of the slip ring 5 around the circumference and across the width thereof.

This prevents the brushes 7 and the slip ring 5 from being non-uniformly worn, thus improving the operational reliability of the generator contact brush device and increasing its useful life.

The proposed current supply arrangement is simple in design which is borne out by the fact that in one embodiment the additional electrically conductive layer 12 is integrally formed with the distributing ring 11; in another embodiment the slip ring 5, the additional electrically conductive layer 12 and the distributing ring 11 are all held together by means of ordinary fastening screws 14; and in the other embodiments the additional electrically conductive layer 12 performs the function of mounting elements so there is no need for special elements for securing the layer itself and the distributing ring 11 to the slip ring 5. As a result, the proposed current supply arrangement is simple and easy to manufacture and assemble and provides an undetachable connection of the additional layer 12 both with the slip ring 5 and the distributing ring 11 by such highly effective methods as explosive impact welding or cold welding under high pressure when using hydraulic and electrohydraulic devices.

All these factors enable, during the manufacturing process, elimination of the steps of matching the comprising elements and reducing the time needed for its assembling.

It is to be understood that the present invention is not limited by the embodiments herein described and illustrated, and that numerous modifications and other embodiments of the proposed current supply arrangement for the rotor winding of an electric machine are possible without departing from the true spirit and scope of the invention defined by the following claims.

What is claimed is:

1. A contact brush device used in an electric machine having a rotor with a shaft and a rotor winding, and including current collecting bars with a plurality of contact brushes and a current supply arrangement for said rotor winding, said arrangement comprising:
   a slip ring fitted onto said rotor shaft with an electrically insulating layer therebetween and being engaged by said contact brushes;
   a distributing ring mounted on the end face of said slip ring;
   a current conducting bar secured to said distributing ring and electrically connected with said rotor winding;
   an additional electrically conductive layer electrically connecting said distributing ring with said slip ring,
   said additional electrically conductive layer being made of a homogeneous material possessing a resistivity lower than the resistivity of the slip ring material, and having a circumference with a cross-sectional area increasing as the distance along an arc starting from the point of junction of said current conducting bar with said distributing ring increases; whereby the electric current flowing through said slip ring between said current collecting bars and said current conducting bar is uniformly distributed around the circumference of said slip ring.

2. A current supply arrangement according to claim 1, wherein said additional electrically conductive layer is shaped like a flat washer interposed between said slip ring and said distributing ring.

3. A current supply arrangement according to claim 1, wherein said additional electrically conductive layer is disposed on the inner surfaces of said slip ring and said distributing ring, the inner openings of said distributing ring and said slip ring being eccentric to central axes of said rings.

4. A current supply arrangement according to claim 3, further provided with an electrically insulating layer interposed between the mating end surfaces of said slip ring and said distributing ring.

5. A current supply arrangement according to claim 1, wherein said slip ring and said distributing ring each have a plurality of through openings evenly spaced around the circumference of said rings and having longitudinal axes parallel to the longitudinal axes of said rings, each of said through openings of said slip rings being disposed opposite to and coaxially with a respective through opening of the same diameter in said distributing ring so that each pair of said through openings defines a ventilation duct, and said additional electrically conductive layer being disposed on the inner surfaces of said ventilation ducts and formed by sleeves having different wall thicknesses that increase as said through openings recede along an arc beginning at the point of junction of said current conducting bar and said distributing ring.

6. A current supply arrangement according to claim 5, wherein said ventilation ducts are equal in diameter, and said sleeves forming said additional electrically conductive layer having inner diameters decreasing from duct to duct as said through openings recede along an arc beginning at the point of junction of said current conducting bar and said distributing ring.

7. A current supply arrangement according to claim 5, wherein said ventilation ducts have diameters increasing from duct to duct as said through openings recede along an arc beginning at the point of junction of said current conduction bar and said distributing ring, and said sleeves forming said additional electrically conductive layer having equal inner diameters.

8. A current supply arrangement according to claim 1, wherein said slip ring and said distributing ring are provided with a plurality of through openings equal in diameter, spaced around the circumference of said rings and having longitudinal axes parallel to the longitudinal axes of said rings, each of said through openings of said slip ring being disposed opposite to and coaxially with a respective through opening of said distributing ring, each pair of said openings defining a ventilation duct, adjacent through openings of each ring being spaced by a distance decreasing from opening to opening as said openings recede along an arc beginning at the point of junction of said current conducting bar and said distributing ring, and said additional electrically conductive layer being formed by sleeves of equal diameter having the same wall thicknesses.

9. A current supply arrangement according to claim 1, wherein said additional electrically conductive layer and said distributing ring are made of the same material.

10. A current supply arrangement according to claim 9, wherein said additional electrically conductive layer is formed as a flat circular projection made on the distributing ring end surface facing said slip ring.

11. A current supply arrangement according to claim 9, wherein said additional electrically conductive layer is formed as a flat washer interposed between slip ring and said distributing ring.

12. A current supply arrangement according to claim 9, wherein said additional electrically conductive layer is disposed on the inner surfaces of said slip ring and said distributing ring, and the inner openings of said distributing ring and said slip ring being eccentric to central axes of said rings.

13. A current supply arrangement according to claim 12, further provided with an electrically insulating layer interposed between the mating end surfaces of said slip ring and said distributing ring.

14. A current supply arrangement according to claim 9, wherein said slip ring and said distributing ring each have a plurality of through openings evenly spaced around the circumference of said rings and having longitudinal axes parallel to the longitudinal axes of said rings, each of said through openings of said slip ring being disposed opposite to and coaxially with a respective through opening of the same diameter in said distributing ring so that each pair of said through openings defines a ventilation duct, and said additional electrically conductive layer being disposed on the inner surfaces of said ventilation ducts and is formed by sleeves having different wall thicknesses that increase from duct to duct as said through openings recede along an arc beginning at the point of junction of said current conducting bar and said distributing ring.

15. A current supply arrangement according to claim 14, wherein said ventilation ducts are equal in diameter, and said sleeves forming said additional electrically conductive layer having inner diameters decreasing from duct to duct as said through openings recede along an arc beginning at the point of junction of said current conducting bar and said distributing ring.

16. A current supply arrangement according to claim 14, wherein said ventilation ducts have diameters increasing from duct to duct as said through openings recede along an arc beginning at the point of junction of said current conducting bar and said distributing ring, and said sleeves forming said additional electrically conductive layer having equal inner diameters.

17. A current supply arrangement according to claim 9, wherein said slip ring and said distributing ring are each provided with a plurality of through openings equal in diameter, spaced around the circumference of said rings and having longitudinal axes parallel to the longitudinal axes of said rings, each of said through openings of said slip ring being disposed opposite to and coaxially with a respective through opening of said distributing ring so that each pair of said through openings defines a ventilation duct, adjacent through openings of each ring being spaced by a distance decreasing from opening to opening as said through openings recede along an arc beginning at the point of junction of said current conducting bar and said distributing ring, and said additional electrically conductive layer being disposed on the inner surfaces of said ventilation ducts and formed by sleeves of equal diameter having the same wall thicknesses.

* * * * *